US010475024B1

(12) United States Patent
Behren et al.

(10) Patent No.: US 10,475,024 B1
(45) Date of Patent: Nov. 12, 2019

(54) SECURE SMART CARD TRANSACTIONS

(71) Applicant: Square, Inc., San Francisco, CA (US)

(72) Inventors: Robert von Behren, San Francisco, CA (US); Oliver S. Quigley, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 982 days.

(21) Appl. No.: 13/652,365

(22) Filed: Oct. 15, 2012

(51) Int. Cl.
*G06Q 20/34* (2012.01)
*G06Q 20/38* (2012.01)

(52) U.S. Cl.
CPC .......... *G06Q 20/341* (2013.01); *G06Q 20/34* (2013.01); *G06Q 20/382* (2013.01)

(58) Field of Classification Search
CPC ............................................. G06Q 20/00–425
USPC ................................................... 705/50–912
See application file for complete search history.

(56) References Cited

U.S. PATENT DOCUMENTS

| | | |
|---|---|---|
| D284,446 S | 7/1986 | Rosenblad |
| 5,434,395 A | 7/1995 | Storck et al. |
| 5,485,073 A | 1/1996 | Kasashima et al. |
| 5,553,294 A | 9/1996 | Nanno et al. |
| 5,679,943 A | 10/1997 | Schultz et al. |
| 5,763,862 A | 6/1998 | Jachimowicz et al. |
| 5,781,013 A | 7/1998 | Takahashi |
| 5,835,366 A | 11/1998 | Pleso et al. |
| 5,933,498 A * | 8/1999 | Schneck et al. ................ 705/54 |
| 5,945,654 A | 8/1999 | Huang |
| 5,949,047 A | 9/1999 | Abe et al. |
| D417,442 S | 12/1999 | Butts et al. |
| 6,150,823 A | 11/2000 | Takahashi et al. |
| 6,213,392 B1 | 4/2001 | Zuppicich |
| 6,230,267 B1 | 5/2001 | Richards et al. |

(Continued)

FOREIGN PATENT DOCUMENTS

| | | |
|---|---|---|
| CA | 152789 S | 9/2014 |
| CA | 2 920 589 A1 | 8/2016 |

(Continued)

OTHER PUBLICATIONS

Ron White, How Computers Work, Oct. 15, 2003, Que Publishing, 7th Ed, p. 4.*

(Continued)

*Primary Examiner* — Mohammad A. Nilforoush
(74) *Attorney, Agent, or Firm* — Polsinelli PC—Square (57) ABSTRACT

A method of securely conducting a financial transaction includes receiving, at a card reader, a first plurality of messages from a smart card; identifying, using the reader, one or more sensitive messages in the first plurality of messages, where the first plurality of messages conforms to a protocol of the financial transaction; encrypting, using the reader, the one or more sensitive messages using a cryptographic key of the reader to generate encrypted messages; formatting, using the reader, a second plurality of messages according to the protocol to send to a mobile device, where the second plurality of messages includes the encrypted messages and messages in the first plurality of messages that are not sensitive; determining, using a mobile device, action steps according to the protocol, where the action steps are determined from the second plurality of messages; and executing the action steps.

21 Claims, 5 Drawing Sheets

(56) References Cited

U.S. PATENT DOCUMENTS

| | | |
|---|---|---|
| 6,355,892 B1 | 3/2002 | Marks |
| 6,497,368 B1 | 12/2002 | Friend et al. |
| D477,321 S | 7/2003 | Baughman |
| 6,698,654 B1 | 3/2004 | Zuppicich |
| 6,763,399 B2 | 7/2004 | Margalit et al. |
| 6,871,278 B1 | 3/2005 | Sciupac |
| 6,945,454 B2 | 9/2005 | Tournemille et al. |
| D553,459 S | 10/2007 | Shor |
| 7,357,309 B2 | 4/2008 | Ghosh et al. |
| D568,130 S | 5/2008 | Arns |
| D575,056 S | 8/2008 | Tan |
| 7,424,732 B2 | 9/2008 | Matsumoto et al. |
| D590,828 S | 4/2009 | Sherrod et al. |
| D600,085 S | 9/2009 | Mandel et al. |
| D607,000 S | 12/2009 | Cheng et al. |
| 7,668,308 B1 | 2/2010 | Wurtz |
| D620,330 S | 7/2010 | Krumpe et al. |
| D624,912 S | 10/2010 | Chen et al. |
| 7,810,729 B2 | 10/2010 | Morley, Jr. |
| D630,073 S | 1/2011 | Krumpe et al. |
| 7,874,483 B2 | 1/2011 | Wang et al. |
| D646,264 S | 10/2011 | Dong |
| D653,664 S | 2/2012 | Turnbull et al. |
| 8,117,453 B2 | 2/2012 | Huque |
| D655,588 S | 3/2012 | Pennington et al. |
| 8,132,670 B1 | 3/2012 | Chen |
| 8,181,871 B2 | 5/2012 | Wang et al. |
| D668,125 S | 10/2012 | Pennington et al. |
| 8,281,998 B2 * | 10/2012 | Tang ................. G06Q 20/32 235/380 |
| 8,297,507 B2 | 10/2012 | Kayani |
| 8,336,771 B2 | 12/2012 | Tsai et al. |
| D675,618 S | 2/2013 | Behar et al. |
| D677,667 S | 3/2013 | Smith et al. |
| 8,397,103 B2 | 3/2013 | Baba |
| D679,714 S | 4/2013 | Smith et al. |
| D680,537 S | 4/2013 | Miller et al. |
| 8,452,004 B2 | 5/2013 | Lee |
| D686,208 S | 7/2013 | Miller et al. |
| 8,500,018 B2 | 8/2013 | McKelvey et al. |
| D689,753 S | 9/2013 | Yoo et al. |
| 8,573,486 B2 | 11/2013 | McKelvey et al. |
| 8,573,487 B2 | 11/2013 | McKelvey |
| 8,584,945 B2 | 11/2013 | Wang et al. |
| D700,606 S | 3/2014 | Lo |
| D703,211 S | 4/2014 | Weller et al. |
| D706,266 S | 6/2014 | Rotsaert |
| 8,740,072 B1 | 6/2014 | Dorogusker |
| 8,751,039 B1 | 6/2014 | Macoviak et al. |
| D711,876 S | 8/2014 | McWilliam et al. |
| 8,807,431 B2 | 8/2014 | Wang et al. |
| D712,892 S | 9/2014 | Hong et al. |
| 8,840,017 B2 | 9/2014 | Chan et al. |
| 8,840,024 B2 | 9/2014 | McKelvey et al. |
| 8,875,990 B2 | 11/2014 | Bishop et al. |
| D724,094 S | 3/2015 | Blochinger et al. |
| D725,655 S | 3/2015 | Debaigue et al. |
| 8,983,873 B2 * | 3/2015 | Lund ........................... 705/67 |
| D726,171 S | 4/2015 | Edwards |
| 9,016,570 B1 | 4/2015 | Gluck |
| D728,549 S | 5/2015 | Su et al. |
| D728,568 S | 5/2015 | Debaigue et al. |
| D731,493 S | 6/2015 | Mills |
| 9,063,737 B2 | 6/2015 | Babu et al. |
| 9,123,036 B2 | 9/2015 | Graylin et al. |
| D740,285 S | 10/2015 | Templeton |
| D740,286 S | 10/2015 | Templeton |
| D740,820 S | 10/2015 | Templeton et al. |
| 9,256,770 B1 | 2/2016 | Edwards |
| 9,355,285 B1 | 5/2016 | Wade et al. |
| D762,651 S | 8/2016 | Edwards et al. |
| D766,238 S | 9/2016 | Nguyen |
| D766,901 S | 9/2016 | Nguyen |
| D774,510 S | 12/2016 | Rotsaert |
| D776,658 S | 1/2017 | Zhu et al. |
| 9,576,159 B1 | 2/2017 | Templeton et al. |
| D780,731 S | 3/2017 | Kim et al. |
| 9,607,298 B2 | 3/2017 | Brudnicki et al. |
| 9,659,195 B2 | 5/2017 | Wade et al. |
| 9,665,867 B2 | 5/2017 | Guise et al. |
| 9,667,426 B2 | 5/2017 | Sekiya et al. |
| D795,869 S | 8/2017 | Templeton |
| 9,736,144 B2 | 8/2017 | McCanna et al. |
| 9,740,849 B2 | 8/2017 | Etchegoyen et al. |
| 9,760,740 B1 | 9/2017 | Edwards |
| 9,760,962 B2 | 9/2017 | Lese |
| 9,769,134 B2 | 9/2017 | Dominguez et al. |
| 9,788,205 B2 | 10/2017 | Sarmah et al. |
| 9,836,594 B2 | 12/2017 | Zhang et al. |
| 9,836,601 B2 | 12/2017 | Pulapaka et al. |
| 9,852,412 B1 | 12/2017 | Post et al. |
| 9,870,491 B1 | 1/2018 | Wade |
| 2002/0084771 A1 | 7/2002 | Lundberg |
| 2004/0151026 A1 | 8/2004 | Naso et al. |
| 2004/0178326 A1 | 9/2004 | Hamilton et al. |
| 2004/0251907 A1 | 12/2004 | Kalley |
| 2005/0023348 A1 | 2/2005 | Lucas et al. |
| 2005/0033688 A1 * | 2/2005 | Peart ................. G06Q 20/04 705/39 |
| 2005/0164631 A1 | 7/2005 | Jin |
| 2005/0242171 A1 * | 11/2005 | Smets ........... G06Q 30/0241 235/380 |
| 2006/0095551 A1 | 5/2006 | Leung et al. |
| 2006/0219776 A1 | 10/2006 | Finn |
| 2006/0255128 A1 | 11/2006 | Johnson et al. |
| 2007/0028118 A1 | 2/2007 | Brown et al. |
| 2007/0063048 A1 | 3/2007 | Havens et al. |
| 2007/0118736 A1 | 5/2007 | Huque |
| 2007/0241182 A1 | 10/2007 | Buer |
| 2007/0255643 A1 | 11/2007 | Capuano et al. |
| 2007/0276765 A1 * | 11/2007 | Hazel et al. .................. 705/71 |
| 2007/0285056 A1 | 12/2007 | Yoon et al. |
| 2008/0011850 A1 | 1/2008 | Henry |
| 2008/0094069 A1 | 4/2008 | Huang |
| 2008/0123862 A1 | 5/2008 | Rowley |
| 2008/0159543 A1 | 7/2008 | Frisch et al. |
| 2008/0301056 A1 | 12/2008 | Weller et al. |
| 2009/0103725 A1 | 4/2009 | Tang et al. |
| 2009/0128090 A1 | 5/2009 | Bi |
| 2009/0144202 A1 * | 6/2009 | Hurry .......................... 705/67 |
| 2009/0150294 A1 | 6/2009 | March et al. |
| 2009/0198618 A1 | 8/2009 | Chan et al. |
| 2009/0224771 A1 | 9/2009 | Deveau et al. |
| 2009/0261166 A1 | 10/2009 | Lawson et al. |
| 2009/0284877 A1 | 11/2009 | Heravi et al. |
| 2009/0302806 A1 | 12/2009 | Lindlar et al. |
| 2010/0128449 A1 | 5/2010 | Mangaroo |
| 2010/0138666 A1 * | 6/2010 | Adams .................. G06F 21/32 713/186 |
| 2010/0243732 A1 | 9/2010 | Wallner |
| 2010/0289390 A1 | 11/2010 | Kenney |
| 2010/0314446 A1 | 12/2010 | Morley, Jr. |
| 2011/0078081 A1 | 3/2011 | Pirzadeh et al. |
| 2011/0121654 A1 | 5/2011 | Recker et al. |
| 2011/0253788 A1 | 10/2011 | Campbell et al. |
| 2011/0307733 A1 | 12/2011 | Tokunaga |
| 2011/0309145 A1 | 12/2011 | Richardson et al. |
| 2012/0005039 A1 | 1/2012 | Dorsey et al. |
| 2012/0005096 A1 | 1/2012 | Dorsey et al. |
| 2012/0011071 A1 | 1/2012 | Pennock et al. |
| 2012/0032681 A1 | 2/2012 | Fink |
| 2012/0051554 A1 | 3/2012 | Modi et al. |
| 2012/0052910 A1 | 3/2012 | Mu et al. |
| 2012/0091200 A1 | 4/2012 | McKelvey et al. |
| 2012/0091201 A1 | 4/2012 | Babu et al. |
| 2012/0095868 A1 | 4/2012 | McKelvey |
| 2012/0095869 A1 | 4/2012 | McKelvey |
| 2012/0095870 A1 | 4/2012 | McKelvey |
| 2012/0095871 A1 | 4/2012 | Dorsey et al. |
| 2012/0095906 A1 | 4/2012 | Dorsey et al. |
| 2012/0095907 A1 | 4/2012 | Dorsey et al. |
| 2012/0095915 A1 | 4/2012 | McKelvey |
| 2012/0095916 A1 | 4/2012 | Dorsey et al. |
| 2012/0097739 A1 | 4/2012 | Babu et al. |

(56) References Cited

U.S. PATENT DOCUMENTS

| | | |
|---|---|---|
| 2012/0097740 A1 | 4/2012 | Lamba et al. |
| 2012/0118956 A1 | 5/2012 | Lamba et al. |
| 2012/0118959 A1 | 5/2012 | Sather et al. |
| 2012/0118960 A1 | 5/2012 | Sather et al. |
| 2012/0126005 A1 | 5/2012 | Dorsey et al. |
| 2012/0126006 A1 | 5/2012 | Dorsey et al. |
| 2012/0126007 A1 | 5/2012 | Lamba et al. |
| 2012/0126010 A1 | 5/2012 | Babu et al. |
| 2012/0126011 A1 | 5/2012 | Lamba et al. |
| 2012/0126012 A1 | 5/2012 | Lamba et al. |
| 2012/0126013 A1 | 5/2012 | Sather et al. |
| 2012/0126014 A1 | 5/2012 | Sather et al. |
| 2012/0130903 A1 | 5/2012 | Dorsey et al. |
| 2012/0132712 A1 | 5/2012 | Babu et al. |
| 2012/0138683 A1 | 6/2012 | Sather et al. |
| 2012/0168505 A1 | 7/2012 | Sather et al. |
| 2012/0210325 A1 | 8/2012 | de Lind van Wijngaarden et al. |
| 2012/0211558 A1 | 8/2012 | Buer |
| 2012/0234918 A1 | 9/2012 | Lindsay |
| 2012/0270528 A1 | 10/2012 | Goodman |
| 2012/0305645 A1 | 12/2012 | Morley, Jr. |
| 2012/0323512 A1 | 12/2012 | Rhodin |
| 2013/0021046 A1 | 1/2013 | Prentice et al. |
| 2013/0024372 A1 | 1/2013 | Spodak et al. |
| 2013/0030997 A1 | 1/2013 | Spodak et al. |
| 2013/0077229 A1 | 3/2013 | Tsai et al. |
| 2013/0087614 A1 | 4/2013 | Limtao et al. |
| 2013/0130743 A1 | 5/2013 | Lin |
| 2013/0140899 A1 | 6/2013 | Tuukkanen et al. |
| 2013/0144792 A1* | 6/2013 | Nilsson ............ G06Q 20/20 705/67 |
| 2013/0173475 A1* | 7/2013 | Lund ............... G06Q 20/20 705/67 |
| 2013/0185559 A1 | 7/2013 | Morel et al. |
| 2013/0211929 A1* | 8/2013 | Itwaru ............ G06Q 20/3415 705/16 |
| 2013/0289908 A1 | 10/2013 | Nonoyama |
| 2013/0290762 A1 | 10/2013 | Pawar |
| 2013/0303277 A1 | 11/2013 | Shigeta |
| 2013/0313903 A1 | 11/2013 | Kayama |
| 2013/0332360 A1 | 12/2013 | Quigley et al. |
| 2014/0089205 A1 | 3/2014 | Kapur et al. |
| 2014/0097242 A1 | 4/2014 | McKelvey |
| 2014/0120866 A1 | 5/2014 | Furtney |
| 2014/0124576 A1 | 5/2014 | Zhou et al. |
| 2014/0167503 A1 | 6/2014 | Redpath et al. |
| 2014/0203082 A1 | 7/2014 | Huh |
| 2014/0258132 A1 | 9/2014 | Swamy et al. |
| 2014/0295761 A1 | 10/2014 | Lo |
| 2014/0297539 A1 | 10/2014 | Swamy et al. |
| 2014/0312691 A1 | 10/2014 | Doljack et al. |
| 2015/0025822 A1 | 1/2015 | Ladret |
| 2015/0078560 A1 | 3/2015 | Ilango et al. |
| 2015/0132624 A1 | 5/2015 | Nagato |
| 2016/0034881 A1 | 2/2016 | Post et al. |
| 2016/0161565 A1 | 6/2016 | Wade |

FOREIGN PATENT DOCUMENTS

| | | |
|---|---|---|
| CN | 302341093 S | 3/2013 |
| CN | 302526592 S | 8/2013 |
| EP | 1 895 312 A1 | 3/2008 |
| EP | 2 693 298 A2 | 2/2014 |
| EP | 3 091 474 A1 | 11/2016 |
| WO | 2012/103138 A1 | 8/2012 |
| WO | 2016/019206 A1 | 2/2016 |
| WO | 2016/094419 A1 | 6/2016 |

OTHER PUBLICATIONS

Jorgensen, A., "Square," dated Nov. 19, 2010, Retrieved from the Internet URL: http://andrew.orgensenfamily.us/2010/11/square/, on Jun. 6, 2014, p. 1-3.

Ryan, P., "Plug and Pay: A Gallery of 26 Mobile Card Readers," Aug. 20, 2013, Retrieved from the Internet URL: http://bankinnovation.net/2013/08/plug-and-pay-a-gallery-of-26-mobile-card-readers/, on Feb. 19, 2015, pp. 1-12.

Thomas, T., "iPhone Credit Card Readers," dated Feb. 11, 2011, Retrieved from the Internet URL: <http://credit-card-processing-review.toptenreviews.com/mobile-credit-card-processing/iphone-credit-card-readers-pg9.html>., on Jun. 6, 2014, p. 1-3.

Final Office Action dated Sep. 28, 2018, for U.S. Appl. No. 14/565,277, of Wade, J., filed Sep. 12, 2014.

Advisory Action dated Dec. 13, 2018, for U.S. Appl. No. 14/565,277, of Wade, J., filed Sep. 12, 2014.

Schaerer, T., "Vom Fensterkomparator zum Prazisions-Schmitt-Trigger," Elektronik Kompendium, Retrieved from the Internet URL: https://web.archive.org/web/20140805054448/http://www.elektronik-kompendium.de/public/schaerer/wincst.htm, pp. 1-22 (Aug. 5, 2014).

Summons to attend oral proceedings for European Patent Application No. 16 155 374.8, dated Mar. 5, 2019.

Non-Final Office Action dated Apr. 10, 2019, for U.S. Appl. No. 14/565,277, of Wade, J., filed Dec. 9, 2014.

Non-Final Office Action dated Aug. 9, 2017, for U.S. Appl. No. 14/565,277, of Wade, J., filed Dec. 9, 2014.

Notice of Allowance dated Aug. 22, 2017, for U.S. Appl. No. 14/472,217, of Post, D.J., et al., filed Aug. 28, 2014.

Notice of Allowance dated Aug. 31, 2017, for U.S. Appl. No. 14/450,128, of Wade, J., filed Aug. 1, 2014.

Office Action for European Patent Application No. 16 155 374.8, dated Oct. 18, 2017.

Final Office Action dated Mar. 27, 2018, for U.S. Appl. No. 14/448,714, of Post, D., et al., filed Jul. 31, 2014.

Notice of Allowance dated Jun. 5, 2018, for U.S. Appl. No. 14/448,714, of Post, D., et al., filed Jul. 31, 2014.

International Search Report and Written Opinion for International Application No. PCT/US2015/043027, dated Nov. 4, 2015.

International Search Report and Written Opinion for International Application No. PCT/US2015/064524, dated Feb. 19, 2016.

Extended European Search Report for European Patent Application No. 16 155 374.8, dated Oct. 11, 2016.

Extended European Search Report for European Patent Application No. 15866468.0, dated Dec. 14, 2017.

Guy, N., "Review: Square, Inc. Square Credit Card Reader (2013)," iLounge, dated Jan. 16, 2014, Retrieved from the Internet URL: http://www.ilounge.com/index.php/reviews/entry/square-inc.-square-credit-card-reader-2013/, on Feb. 19, 2015 , pp. 1-4.

Kuphaldt, T.R., "Practical Considerations—Batteries," Lessons in Electric Circuits, Batteries and Power Systems, Chapter 11, vol. I—DC, Retrieved from the Internet URL: www.allaboutcircuits.com/textbook/direct-current/chpt-11 /practical-considerations-batteries, on Jun. 9, 2017, pp. 1-5.

Scherz, P., "Practical Electronics for Inventors," The McGraw-Hill Companies, Inc., pp. 1-8 (2000).

Wehner, M., "The Unofficial Apple Weblog, Square credit card reader loses weight, gains accuracy", TUAW, dated Dec. 9, 2013, Retrieved from the Internet URL: http://www.tuaw.com/2013/12/09/square-credit-card--reader-loses-weight-gains-accuracy/, on Feb. 19, 2015, p. 1.

Non-Final Office Action dated Oct. 8, 2013, for U.S. Appl. No. 13/826,171, of Dorogusker, J., filed Mar. 14, 2013.

Notice of Allowance dated Jan. 24, 2014, for U.S. Appl. No. 13/826,171, of Dorogusker, J., filed Mar. 14, 2013.

Non-Final Office Action dated Jan. 29, 2014, in Design U.S. Appl. No. 29/447,765, of Templeton T., filed Mar. 6, 2013.

Non-Final Office Action dated Sep. 10, 2014, in Design U.S. Appl. No. 29/447,765, of Templeton T., filed Mar. 6, 2013.

Certificate of Design Registration for European Patent Application No. 002578674, dated Nov. 14, 2014.

Notification of Registration of a Design for Australian Application No. 201415781, dated Nov. 27, 2014.

First Examination Report for Indian Design Application No. 267386, dated Feb. 5, 2015.

Non-Final Office Action dated Feb. 20, 2015 for U.S. Appl. No. 14/512,104, of Templeton, T., et al., filed Oct. 10, 2014.

(56) References Cited

OTHER PUBLICATIONS

First Examination Report for Australian Design Application No. 201415781, dated Feb. 23, 2015.
Final Office Action dated Mar. 20, 2015, in Design U.S. Appl. No. 29/447,765, of Templeton T., filed Mar. 6, 2013.
English-language translation of Notice of Reasons for Rejection for Japanese Application No. 2014-025525, dated Mar. 31, 2015.
Notice of Allowance dated Jun. 5, 2015, in Design U.S. Appl. No. 29/447,765, of Templeton T., filed Mar. 6, 2013.
Notice of Allowance dated Jun. 10, 2015, for Design U.S. Appl. No. 29/491,147, of Templeton T., et al., filed May 16, 2014.
Examiner's Report for Canadian Industrial Design Application No. 159528, dated Jun. 11, 2015.
Non-Final Office Action dated Jun. 22, 2015 for U.S. Appl. No. 14/322,815, of Edwards, T., filed Jul. 2, 2014.
Certificate of Registration of Design for Indian Design Application No. 267386 dated Jul. 7, 2015.
Non-Final Office Action dated Jul. 27, 2015 for Design U.S. Appl. No. 29/493,212, of Edwards, T., et al., filed Jun. 6, 2014.
Second Examination Report for Australian Designt Application No. 201415781, dated Aug. 13, 2015.
Non-Final Office Action dated Sep. 18, 2015, for U.S. Appl. No. 14/450,128, of Wade, J., filed Aug. 1, 2014.
Notice of Allowance dated Oct. 5, 2015 for U.S. Appl. No. 14/322,815, of Edwards, T., filed Jul. 2, 2014.
English-language translation of Final Rejection for Japanese Application No. 2014-025525, dated Oct. 20, 2015.
Non-Final Office Action dated Oct. 29, 2015 for U.S. Appl. No. 14/512,104, of Templeton, T., et al., filed Oct. 10, 2014.
Ex parte Quayle Action dated Nov. 20, 2015 for U.S. Appl. No. 14/620,699, of Wade, J., et al., filed Feb. 12, 2015.
Examiner's Report for Canadian Industrial Design Application No. 159528, dated Dec. 1, 2015.
Final Office Action dated Jan. 15, 2016, for Design U.S. Appl. No. 29/493,212, of Edwards, T., et al., filed Jun. 6, 2014.
Notice of Allowance dated Feb. 5, 2016, for U.S. Appl. No. 14/620,699, of Wade, J., et al., filed Feb. 12, 2015.
Examiner Requisition for Canadian Patent Application No. 2,920,589, dated Mar. 11, 2016.
Notice of Allowance dated Mar. 28, 2016, for Design U.S. Appl. No. 29/493,212, of Edwards, T., et al., filed Jun. 6, 2014.
Non-Final Office Action dated Apr. 11, 2016, for U.S. Appl. No. 14/450,128, of Wade, J., filed Aug. 1, 2014.
Non-Final Office Action dated May 6, 2016, for U.S. Appl. No. 14/512,104, of Templeton, T., et al., filed Oct. 10, 2014.
Non-Final Office Action dated Aug. 16, 2016, for U.S. Appl. No. 14/312,524, of Edwards, T., filed Jun. 23, 2014.
Non-Final Office Action dated Aug. 17, 2016, for U.S. Appl. No. 14/985,624, of Wade, J., et al., filed Dec. 31, 2015.
Notice of Allowance for Canadian Patent Application No. 2,920,589, dated Sep. 21, 2016.
Notice of Allowance dated Oct. 7, 2016, for U.S. Appl. No. 14/512,104, of Templeton, T., et al., filed Oct. 10, 2014.
Non-Final Office Action dated Oct. 28, 2016, for U.S. Appl. No. 14/450,128, of Wade, J., filed Aug. 1, 2014.
Notice of Allowance dated Jan. 12, 2017, for U.S. Appl. No. 14/985,624, of Wade, J., et al., filed Dec. 31, 2015.
Non-Final Office Action dated Jan. 13, 2017, for U.S. Appl. No. 14/448,714, of Post, D., et al., filed Jul. 31, 2014.
Non-Final Office Action dated Feb. 9, 2017, for U.S. Appl. No. 14/472,217, of Post, D.J., et al., filed Aug. 28, 2014.
Final Office Action dated Feb. 23, 2017, for U.S. Appl. No. 14/312,524, of Edwards, T., filed Jun. 23, 2014.
Certificate of Industrial Design Registration for Canadian Design Application No. 159528, dated Feb. 27, 2017.
Certificate of Industrial Design Registration for Canadian Design Application No. 166511, dated Feb. 27, 2017.
Corrected Notice of Allowance dated Apr. 10, 2017, for U.S. Appl. No. 14/985,624, of Wade, J., et al., filed Dec. 31, 2015.
Notice of Allowance dated May 5, 2017, for U.S. Appl. No. 14/312,524, of Edwards, T., filed Jun. 23, 2014.
Notice of Allowance dated Jun. 12, 2017, for Design U.S. Appl. No. 29/539,675, of Templeton, T., filed Sep. 16, 2015.
Final Office Action dated Jun. 16, 2017, for U.S. Appl. No. 14/450,128, of Wade, J., filed Aug. 1, 2014.
Non-Final Office Action dated Jul. 10, 2017, for U.S. Appl. No. 14/448,714, of Post, D., et al., filed Jul. 31, 2014.
Non-Final Office Action dated Aug. 14, 2019, for U.S. Appl. No. 15/692,501, of Edwards T., filed Aug. 31, 2017.
Final Office Action dated Sep. 9, 2019, for U.S. Appl. No. 14/565,277, of Wade, J., filed Dec. 9, 2014.

* cited by examiner

SECURE SMART CARD TRANSACTIONS

TECHNICAL FIELD

This disclosure relates to secure payment transactions with smart cards.

BACKGROUND

In a conventional Europay, Mastercard, Visa (EMV) transaction with a smart card (also called a "chip card" or "integrated circuit card"), a card reader meets certification requirements for level 1 and level 2. To be certified for level 1, the card reader must properly implement physical, electrical, and transport level interfaces for communication conforming to EMV protocol. To be certified for level 2, the card reader must properly implement, according to the EMV protocol, payment application selection and financial transaction processing. A point-of-sale terminal requires satisfying requirements established by both levels of certification to conduct a complete EMV transaction.

When conducting a point-of-sale credit card transaction with a smart card, a cardholder's identity is confirmed by requiring the entry of a Personal Identification Number (PIN) rather than or in addition to signing a paper receipt. A user provides a card at the point-of-sale to a merchant. The card contains an embedded microchip which stores the PIN. The merchant processes the card using a card reader, e.g., the card is inserted into the reader to engage electrical contacts for the microchip. The card reader verifies the card as authentic and waits for the user to enter the PIN. The user can enter the PIN on a keypad terminal of the reader, i.e., the keypad and the reader are a single physically integrated device. In some implementations, after the user enters the PIN, the microchip notifies the card reader as to whether the entered PIN is correct or incorrect. In some other implementations, the card reader sends the PIN to a credit card processor that replies with a determination as to whether the entered PIN is correct or incorrect.

The card transaction is further authorized and captured. In the authorization stage, if the entered PIN is correct, a payment request is sent electronically from the card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include a cardholder's signature, if appropriate. The capture state can trigger the financial transaction between the card issuer and the merchant, and optionally creates a receipt. There can also be other entities, e.g., the card acquirer, in the route of the transaction. Debit card transactions have a different routing, but also require insertion of the smart card into a reader.

SUMMARY

Financial transactions using mobile devices pose particular problems for security. For example, malware could be placed on a mobile device. If present, such malicious software could intercept financial data, which in turn could enable fraudulent transactions. An approach for securely conducting a financial transaction is for a card reader to encrypt sensitive messages before transmission to a mobile device. The card reader can encrypt any message or portion of the message that is not in a whitelist of approved message types. The mobile device can determine a next action step according to a protocol of the transaction without being able to access content of the encrypted messages. For example, the next action step can be to send the encrypted messages to a financial processor. The financial processor can decrypt the encrypted messages and send a response to the mobile device. To continue the transaction, the mobile device processes the response. In some implementations, the response includes an encrypted portion for the card reader. The mobile device forwards the encrypted portion to the card reader, which decrypts and processes the encrypted portion.

In one aspect, a method of securely conducting a financial transaction includes receiving, at a card reader, a first plurality of messages from a smart card; identifying, using the reader, one or more sensitive messages in the first plurality of messages, where the first plurality of messages conforms to a protocol of the financial transaction; encrypting, using the reader, the one or more sensitive messages using a cryptographic key of the reader to generate encrypted messages; formatting, using the reader, a second plurality of messages according to the protocol to send to a mobile device, where the second plurality of messages includes the encrypted messages and messages in the first plurality of messages that are not sensitive; determining, using a mobile device, action steps according to the protocol, where the action steps are determined from the second plurality of messages; and executing the action steps.

Implementations may include one or more of the following features. The second plurality of messages is to be authenticated by a secure server, and the action steps comprising: sending the second plurality of messages from the reader to the mobile device; forwarding the second plurality of messages from the mobile device to the secure server; decrypting the one or more encrypted messages using a cryptographic key of the secure server; and processing the second plurality of messages of the transaction using the secure server. Sending data from the secure server to the mobile device, where the data is encrypted using the cryptographic key of the secure server; forwarding the data from the mobile device to the reader, where the mobile device acts as a proxy; processing the data at the reader using the cryptographic key of the reader. The data is an updated list of approved message types, and where the reader replaces a list of approved message types with the updated list. The reader includes a Level 1 kernel. The mobile device includes a Level 2 kernel. The protocol is the Europay, Mastercard, Visa protocol. The identifying, for each message in the first plurality of messages, further comprises: determining a type of the message is not in a list of approved message types; identifying the message as sensitive. The identifying, for each message in the first plurality of messages, further comprises: determining a type of the message is in a list of sensitive message types; identifying the message as sensitive. The action steps comprise sending one or more messages from the reader to the smart card. The one or more messages to the smart card are included in a list of approved messages. The one or more messages to the smart card are not included in a list of restricted messages. The cryptographic key of the reader is included during manufacturing. The cryptographic key of the reader is obtained from the secure server based on a unique identification of the reader, where the unique identification is included during manufacturing. The encrypting comprises encrypting one or more portions of each of the one or more sensitive messages In another aspect, a method of securely conducting a transaction at a reader, comprising: receiving a first plurality of messages from a smart card; identifying one or more sensitive messages in the first plurality of messages, where the first plurality of messages conforms to a protocol of the transaction; encrypting the one or more sensitive messages using a cryptographic key; formatting a second plurality of messages according to the protocol to send to a mobile device, where the second plurality of messages includes the one or more sensitive messages and messages in the first plurality of messages that are not sensitive; sending the plurality of messages including the one or more encrypted messages to the mobile device.

Implementations may include one or more of the following features. Encrypting comprises encrypting one or more portions of each of the one or more sensitive messages The reader includes a Level 1 kernel. The identifying, for each message in the first plurality of messages, further comprises: determining a type of the message is not in a list of approved message types; identifying the message as sensitive. The cryptographic key of the reader is obtained from the secure server based on a unique identification of the reader, where the unique identification is included during manufacturing.

In another aspect, a method of securely conducting a transaction at a mobile device, comprising: receiving a first plurality of messages from the card reader, where the first plurality of messages includes one or more encrypted messages; determining action steps according to a protocol of the transaction, where the action steps are determined from the first plurality of messages; and executing the action steps.

Implementations may include one or more of the following features. The mobile device includes a Level 2 kernel. The action steps comprising: sending the first plurality of messages to a secure server, where the secure server decrypts the one or more encrypted messages using a cryptographic key. The action steps comprising: sending a second plurality of messages to a card reader, where the card reader formats the second plurality of messages according to the protocol.

Advantages may include one or more of the following. A mobile device and a card reader can, as separate devices, securely conduct an EMV transaction. The card reader can be simplified to pass messages from a card to the mobile device and only encrypt messages that are identified as sensitive. The reader's simplicity reduces power consumption and manufacturing cost. The mobile device can leverage its existing processor to execute a decision tree that conforms to an EMV protocol, thereby efficiently using the mobile device's computing power without requiring a powerful processor inside the card reader. The mobile device is also unable to access encrypted content from the card reader, which provides security in case the mobile device is compromised.

Other aspects, features and advantages may be apparent from the detailed description and the drawings.

BRIEF DESCRIPTION OF THE DRAWINGS

Like reference numbers and designations in the various drawings indicate like elements.

DETAILED DESCRIPTION

Figure 1:
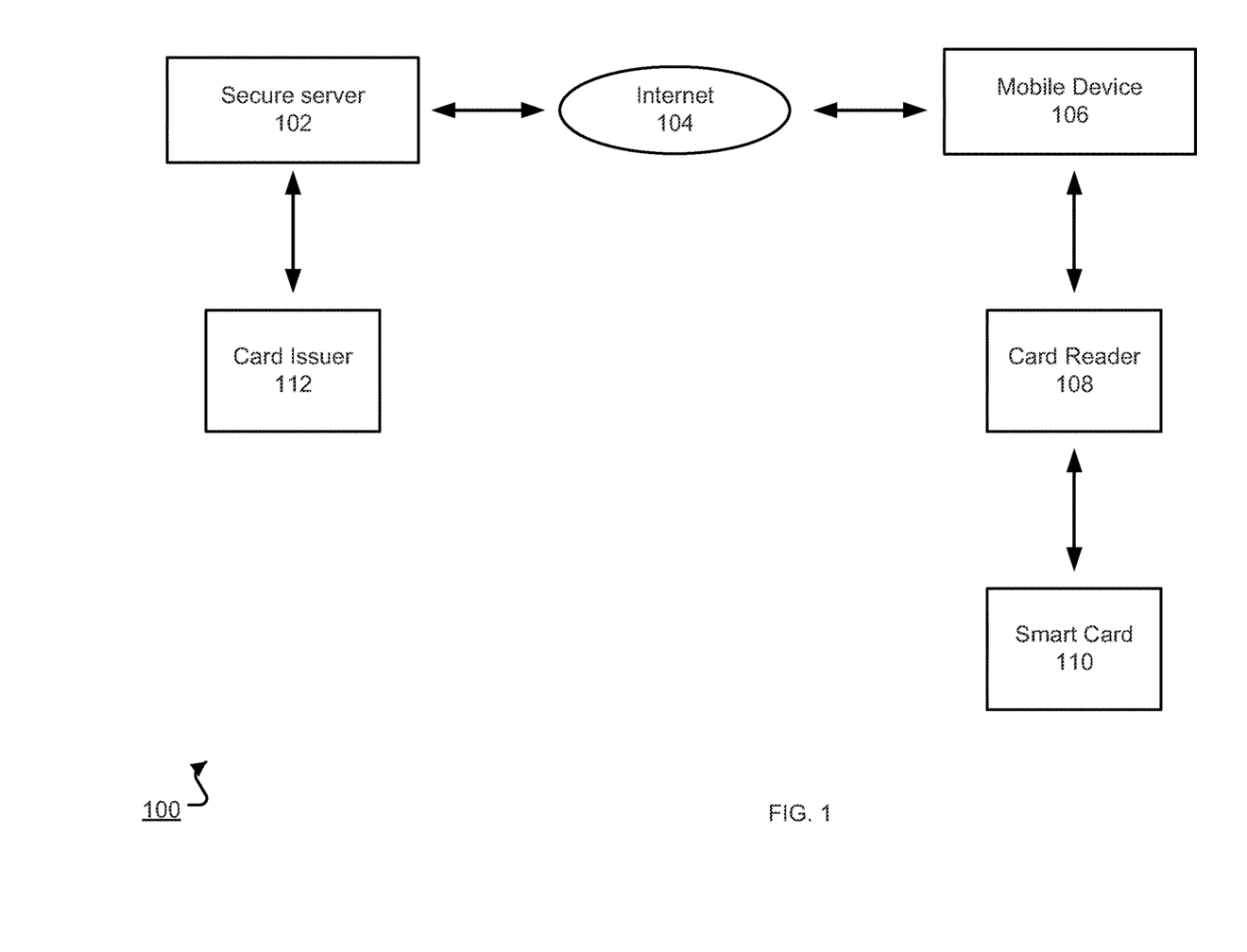
FIG. 1 is a schematic illustration of an example secure financial transaction system.

FIG. 1 is a schematic illustration of an example secure financial transaction system. In some examples, the system 100 is used for conducting a Europay, Mastercard, Visa (EMV) transaction, e.g., a transaction using PIN entry. In some implementations, the system 100 is capable of processing a transaction (e.g., payment transaction) initiated by a mobile computing device 106 and a card reader 108. The system 100 can process a payment transaction according to the EMV protocol.

The mobile computing device 106 can be a smart phone, tablet computer or laptop, or other mobile data processing apparatus. The card reader 108 can be detachably connected to the mobile computing device 106. The card reader 108 is a device that reads data from a storage medium on a card, e.g., a smart card 110. The card reader 108 need not have a display or a keyboard, but the card reader 108 has an interface for inserting or swiping a card.

As a general overview, the smart card 110 can be inserted into the card reader 108 so that the reader 108 engages electrical contacts for a microchip on the card 110. In some implementations, the card reader 108 is attached to an audio jack or headset jack of the mobile device 106. In alternative implementations, the card reader 108 communicates with the mobile device 106 wirelessly, e.g., using Bluetooth technology or a WiFi hotspot. The mobile device 106 receives data from a user interaction reflecting a PIN from the user, e.g., entered through a user interface of the mobile device 106, e.g., a touch-screen display, and sends the PIN to a card issuer 112 for confirmation. The card reader 108 can read data from the microchip on the card 110. In some implementations, the PIN is entered at the card reader 108.

The card reader 108 provides the data from the microchip to the mobile device 106, which sends the data to the card issuer 112 for authentication. In some implementations, the secure server 102 can relay the transaction to the card issuer 112, which ultimately approves or denies the transaction. There can also be other entities, such as a card network, e.g., Visa or MasterCard, or a card acquirer, in the route of the transaction. The mobile device 106 can transmit an authorization for transaction to a secure server 102 for payment processing using an external network, e.g., the Internet 104. The card issuer 112 can communicate the approval or denial to the secure server 102, which can relay the card issuer's response to the mobile device 106. More transaction details will be discussed below in reference to FIG. 3.

Figure 2:
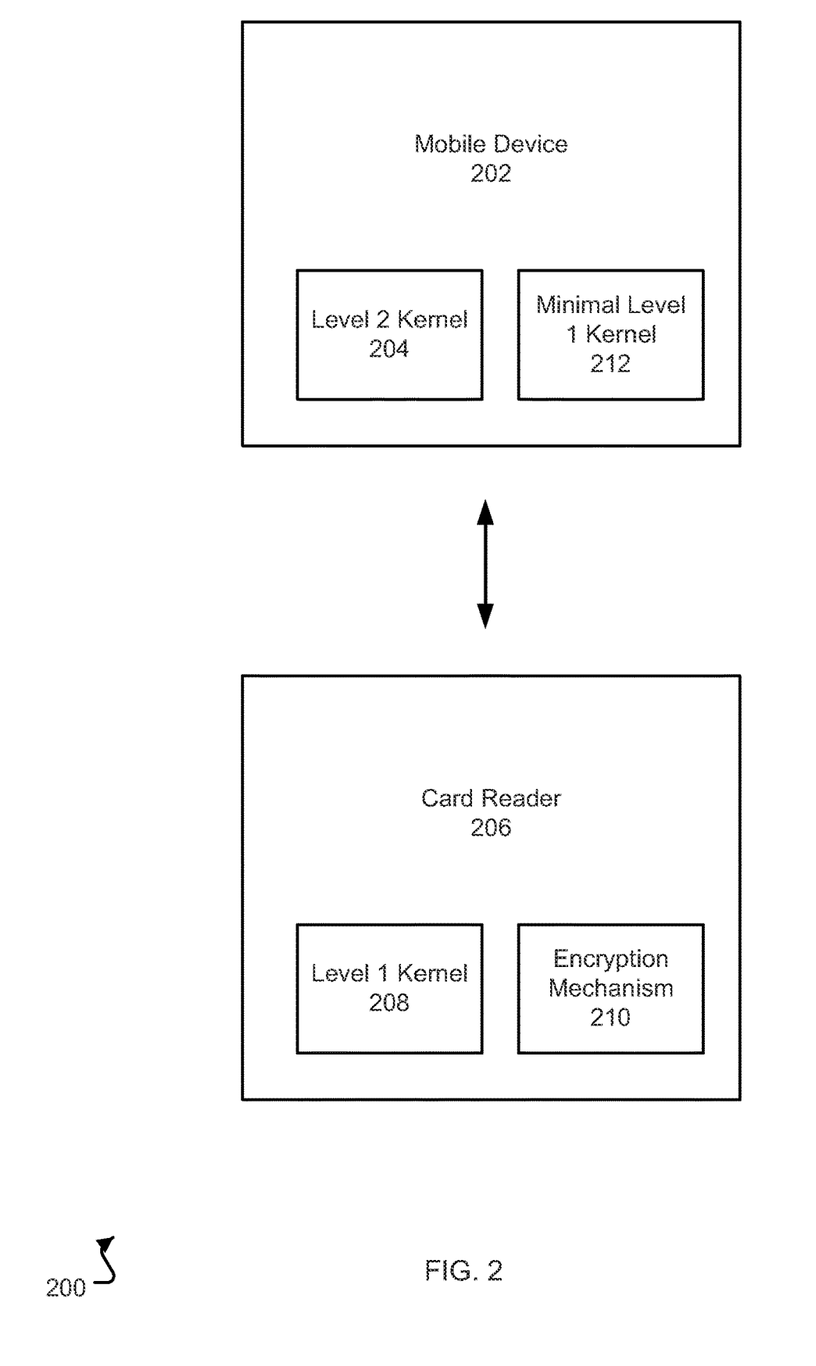
FIG. 2 is a schematic illustration of components of a card reader and a mobile device.

FIG. 2 is a schematic illustration 200 of components of a card reader 206 and a mobile device 202. Generally, level 1 and level 2 kernels are both included in the card reader. A level 1 kernel specifies how to communicate according to an EMV protocol on a low level, e.g., on an electromechanical and physical level. The level 1 kernel can specify a required voltage, a sequence in which data is sent, or a speed of transmitting information. A level 2 kernel specifies logic for financial processing on a high level, e.g., an application level. For example, the level 2 kernel can specify an application type to be used, e.g., credit or debit.

Here, the card reader 206 can include only a level 1 kernel 208 while the mobile device 202 implements a level 2 kernel 204 and a minimal level 1 kernel 212. When communicating, the card reader 206 uses the level 1 kernel 208 to format messages to conform to the transaction protocol, e.g., EMV, but the mobile device 202 uses the level 2 kernel 204 to continue executing the transaction. The minimal level 1 kernel 212 can be used to process data received from the card reader 206. For example, when communicating with a card inserted at the card reader 206, the card reader 206 receives data from the card and creates a message with appropriate header and payload that encapsulates the data. The message can include an appropriate payload length. The card reader 206 can send the message to the mobile device 202. The mobile device 202 can use the minimal level 1 kernel 212 to process the message and the level 2 kernel 204 to determine a proper next step that conforms to the EMV transaction protocol, e.g., selecting an application type or a verification type. The mobile device 202 can send a response message to the card reader 206, which formats the response message using the level 1 kernel 208. In some implementations, instead of the minimal level 1 kernel 212, the mobile device implements a proprietary protocol to send messages to the card reader 206.

The card reader 206 can also use an encryption mechanism 210 to identify messages that are sensitive and encrypt those messages, which will be described further below in reference to FIG. 4.

Figure 3:
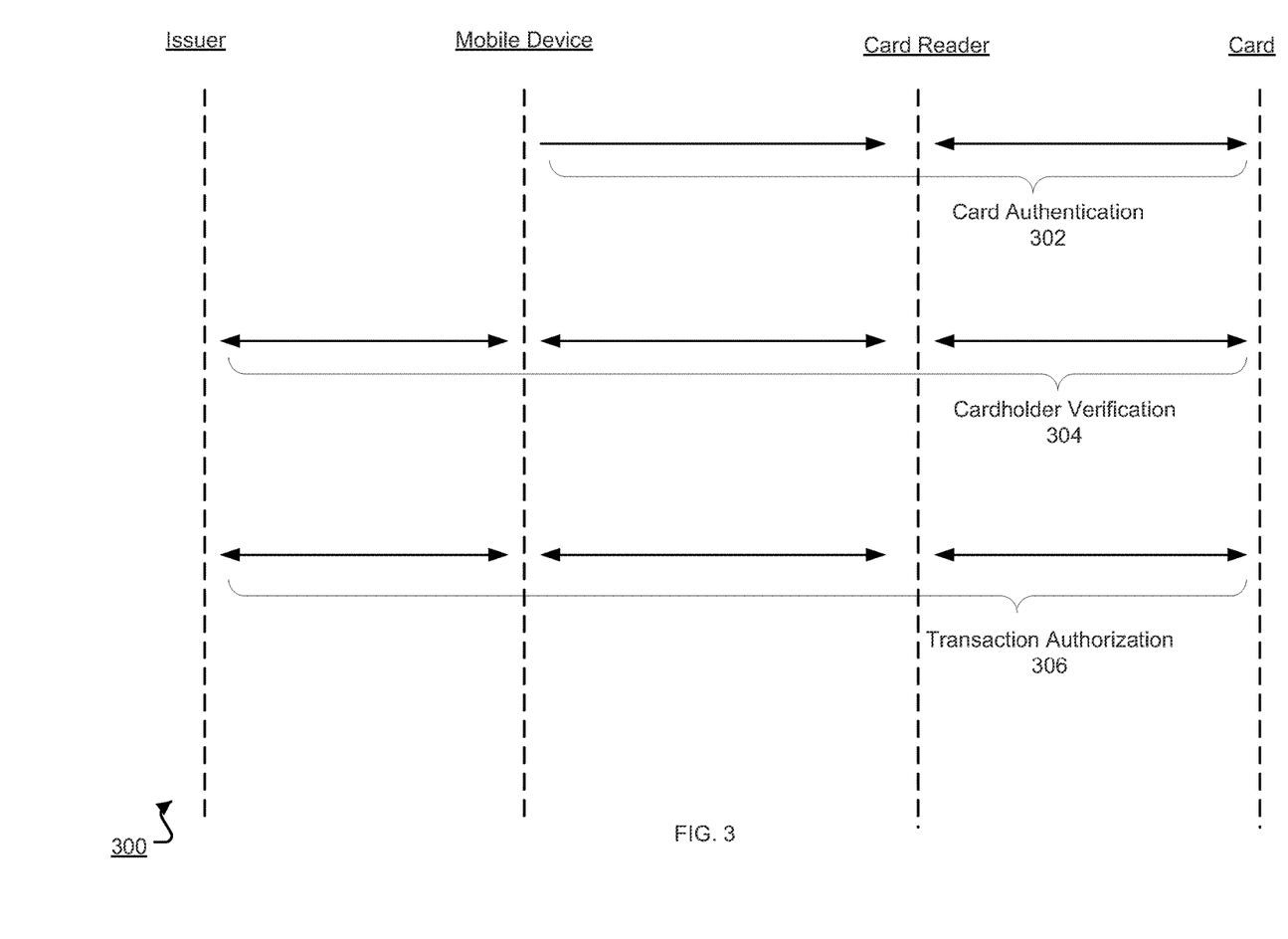
FIG. 3 is a diagram of an example diagram illustrating different phases of an EMV transaction.

FIG. 3 is an example diagram 300 illustrating different phases of an EMV transaction. Conducting an EMV transaction requires three phases, which can be specified by a level 2 kernel: 1) card authentication (step 302), 2) cardholder verification (step 304), and 3) transaction authorization (step 306). These three phases involve communication between a card, a card reader, a mobile device, and an issuing bank.

The card can communicate with the card reader over electrical contacts or contactless circuitry, e.g., Near Field Communication (NFC), in the card reader. The card reader can communicate with the mobile device over an audio jack of the mobile device or over a wireless connection. The mobile device can communicate with the issuing bank using an Internet, e.g., WiFi, or 3G/4G, data connection. In some implementations, the mobile device communicates with a secure server, which in turn communicates with the issuer. The mobile device can use the secure server to store information related to the transaction, e.g., a transaction receipt.

Generally, the card authentication phase (step 302) commences when a card is inserted into the card reader. The card reader requests a list of supported applications (in this context the "applications" refer to types of financial transactions, e.g., credit, debit, or ATM) from the card chip. For example, this list of supported applications can be stored in the file 1PAY.SYS.DDF01, which is selected by the card reader. The card chip sends the list, e.g., the file contents, to the card reader. The card reader receives input, e.g., from the mobile device, selecting a type of application, and sends a message to the card chip selecting the application and starting the transaction. In some implementations, the card reader selects the supported application from the list.

The message starting the transaction can serve as a "read record" command to read cardholder records from the card chip. These records can include card details, e.g., primary account number, start and expiry date, backwards compatibility data, e.g., a copy of a magnetic strip, and control parameters, e.g., a type of authentication method to be used, for example, signature, PIN, or none. In some implementations, the records include a digital signature, which can be later verified by an issuing bank.

In the cardholder verification phase (step 304), the card can prompt the card reader for a PIN. The card reader then prompts the mobile device for a PIN. After the mobile device receives data based on the user's interaction with the UI, the mobile device sends this user interaction data to the server. The user interaction data can be based on locations of user input on the UI. The server translates the user interaction data into numbers corresponding to an inputted PIN. The inputted PIN is provided to the card issuer. The card issuer determines if the inputted PIN matches a PIN associated with the card and indicates whether the PIN entry is a failure or success. In some implementations, the card maintains a retry counter to limit the number of failed PIN entries. That is, the card can reject a PIN for processing if too many PINs have been entered.

In the transaction authorization phase (step 306), the card reader requests the card to generate an authorization request cryptogram (ARQC). The request can include or be followed by the transaction details, which are provided by the mobile device. The transaction details can include transaction amount, currency type, date, terminal verification results (TVR), and/or a nonce generated by the card reader. In response, the card chip generates the ARQC, which includes a cryptographic message authentication code (MAC). The MAC can be generated based on the transaction details. The ARQC can also include an application transaction counter (ATC), which is a sequence counter identifying the transaction, issuer application data (IAD), which is a variable length field containing data generated by the card. In some implementations, the MAC is generated using a symmetric key shared between the card and the issuing bank.

If the card permits the transaction, the card sends the ARQC to the card reader, which sends the ARQC to the mobile device. The mobile device then sends the ARQC to the issuing bank. The issuing bank can perform various cryptographic, anti-fraud, and financial checks on the ARQC. If the checks are satisfied, the issuing bank sends an authorization response code (ARC) that indicates a transaction approval or denial and an authorization response cryptogram (ARPC). In some implementations, the ARPC is a MAC resulting from an XOR operation between the ARQC and the ARC. The card reader sends both the ARPC and the ARC to the card.

The card validates the MAC contained within the ARPC. If the validation is successful, the card can update its internal state to note that the issuing bank has authorized the transaction. The card can send a transaction certificate cryptogram (TC) to the card reader. The TC indicates that the card is authorizing the transaction to proceed. After receiving the TC, the card reader sends the TC to the mobile device, which sends the TC to the issuer. The card reader, the mobile phone, or, if applicable, the secure server can store a copy of the TC in case of a dispute.

Some data sent during these three phases is sensitive, e.g., data including the ARQC, while other data is not sensitive, e.g., a request to the card for an application directory. Handling of sensitive and non-sensitive data is described further below in reference to FIG. 4.

Figure 4:
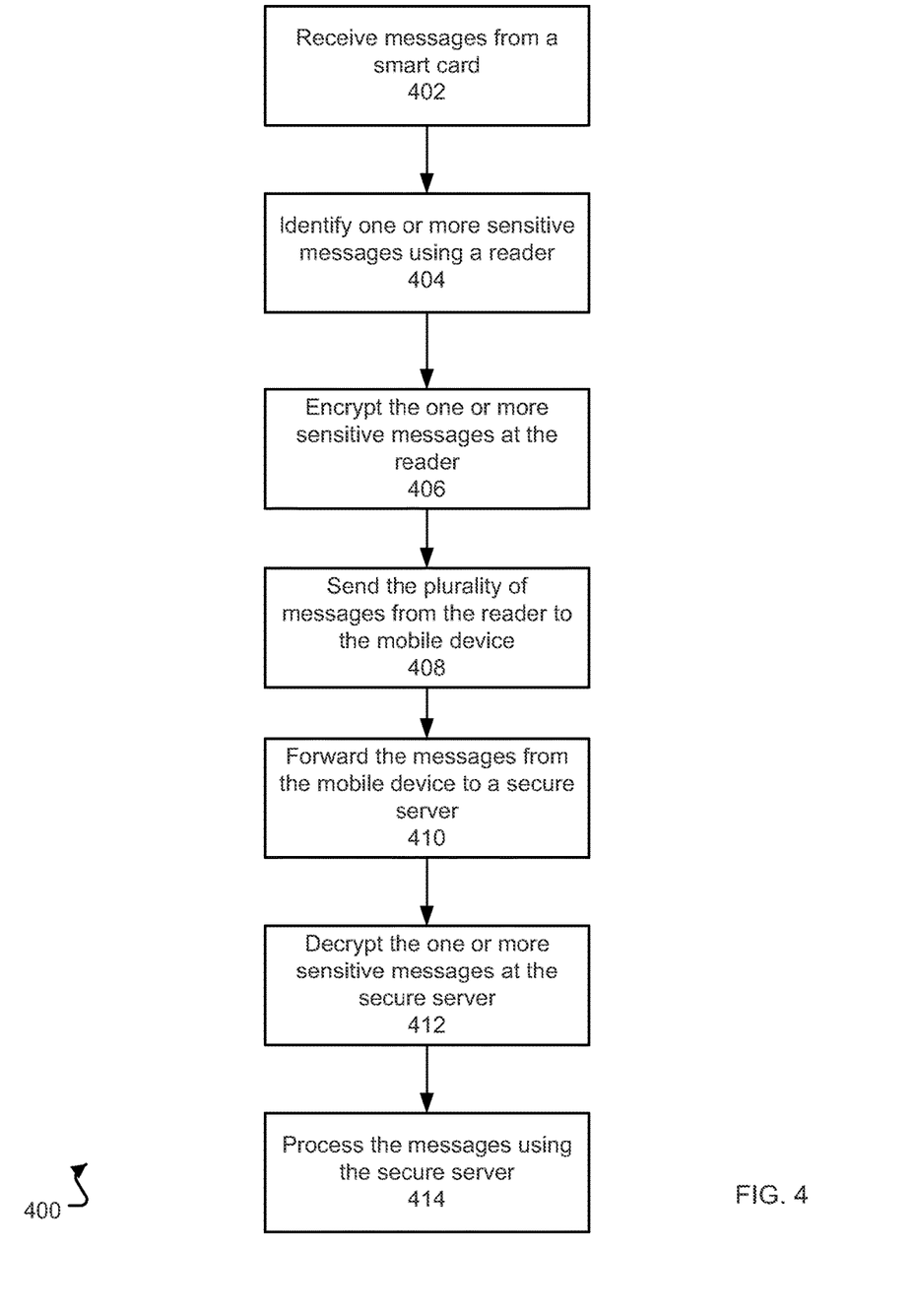
FIG. 4 is a flow chart of a method of conducting a transaction with a smart card.

FIG. 4 is a flow chart 400 of a method of conducting a secure transaction with a smart card. The card reader receives messages from a smart card (step 402). The messages can include any messages in the three phases described above in reference to FIG. 3, e.g., an ARQC message. In some implementations, individual messages are received over time. In alternative implementations, messages are received in batch form.

The card reader identifies one or more sensitive messages from the received messages (step 404). For each message, the card reader can determine a message type. For example, the message type can be a tag value that indicates a structure or header of the message. That is, a message including a card number can have a different tag value than that of a message including a transaction identification. The card reader can include a whitelist of approved message types, e.g., stored in embedded memory during manufacturing of the reader. In some implementations, the whitelist of approved message types is a list of tag values that are deemed to be not sensitive. As a result, the card reader compares a tag value from a message to the whitelist. If the tag value is in the whitelist, the card reader does not identify the message as sensitive. If the tag value is not in the whitelist, the card reader identifies the message as sensitive. This approach can provide additional security by identifying messages with unknown tag values as sensitive by default.

In alternative implementations, the card reader includes a blacklist of sensitive message types. If the tag value from the message is in the blacklist, the card reader identifies the message as sensitive. If the tag value is not in the blacklist, the card reader does not identify the message as sensitive.

The card reader can include a cryptographic key. In some implementations, a cryptographic key is embedded in the card reader during manufacturing. In alternative implementations, the card reader includes a unique identification embedded during manufacturing of the reader. The card reader can send the unique identification to a secure server, e.g., through a mobile device as a medium. The secure server can respond with a cryptographic key based on the unique identification. The card reader caches the cryptographic key and can use the key to encrypt and decrypt communication with the secure server. In some other implementations, the card reader includes a first cryptographic key and unique identification during manufacturing. The card reader can send the unique identification to the secure server. The secure server can retrieve the first cryptographic key based on the unique identification. The secure server generates a second cryptographic key that is short-lived and encrypts the second cryptographic key using the first cryptographic key. The secure server then sends the encrypted second cryptographic key to the card reader, which decrypts using the first cryptographic key included during manufacturing. The card reader can use the second cryptographic key to communicate with the secure server. In some implementations, the reader temporarily stores sensitive data, e.g., storing a card number during duration of a transaction, when a smart card is inserted. The mobile device can request that the reader perform certain actions on the sensitive data, e.g., cryptographic hash.

The card reader encrypts the one or more messages identified as sensitive using the cryptographic key (step 406). The card reader can encrypt one or more portions of each sensitive message instead of the entire sensitive message. For example, the card reader can encrypt a payload of a sensitive message and leave a header of the sensitive message unencrypted. Some sensitive messages can include a card number, personally identifiable information such as name, and expiration date. Some non-sensitive messages can include messages such as a payment application type or a transaction identification. The non-sensitive messages are not encrypted, and can simply be passed to the mobile device.

The card reader can correctly format the messages, e.g., as specified by a level 1 kernel, and send the messages to a mobile device (step 408). As described above, the reader can send data, which is partially encrypted, to the mobile device either wirelessly or through a physical connection, e.g., an audio jack. In some implementations, the reader is embedded within the mobile device, e.g., the reader is an NFC controller chipset embedded on an NFC-enabled phone.

The mobile device can receive the messages from the card reader and process the messages, e.g., using a minimal level 1 kernel. The mobile device does not have the cryptographic key, and therefore cannot decrypt or encrypt any communication between the reader and the secure server.

In some implementations, each message includes an unencrypted header that indicates a type of message, e.g., which can determine a next action step as described below. The minimal level 1 kernel can parse the headers of the message.

By analyzing the headers, the mobile device can determine one or more next action steps and execute the next action steps. A next action step can follow the protocol, e.g., determined by a level 2 kernel on the mobile device. For example, if the headers indicate a message includes a list of supported applications, the next action step can be to send a message including a selected application to the card. The mobile device can send the message to the card reader, which can correctly format the request, e.g., using the reader's level 1 kernel. If the headers of the message indicates the message payload includes an ARQC message, the next action step can be to authenticate the ARQC with a secure server. As a result, the mobile device forwards the messages to the secure server (step 410). In some implementations, the mobile device determines the next action steps by analyzing timing of when the messages are received at the mobile device. For example, if a message is received within a threshold time from a previous message, the messages can indicate a next action step that is different from a message received outside the threshold time. In some other implementations, the mobile device determines the next action steps by analyzing structure of the messages, e.g., a length of a message. For example, a message having a longer length can indicate a next action step that is different from a message having a shorter length.

The secure server decrypts the one or more encrypted messages (step 412). The secure server has a cryptographic key that can decrypt the encrypted messages, e.g., the cryptographic key is associated with a unique identification of the reader. In some implementations, the server's cryptographic key and the reader's cryptographic key are shared symmetric keys. The secure server can detect each encrypted message, e.g., from the message's payload, and use its cryptographic key to decrypt each message.

The secure server processes the decrypted messages (step 414). For example, a message can request an approval of a transaction. The secure server can access a financial account associated with a customer of the transaction and contact a card issuer to determine whether to approve or disapprove the transaction.

The system can send a response to the message to the mobile device. In some implementations, the secure server and the mobile device share a set of cryptographic keys that are not shared with the card reader. For example, the secure server and the mobile device can send and process the response using the set of cryptographic keys, respectively.

In some implementations, the secure server sends data having the reader as its destination. The data can be encrypted with the server's cryptographic key that is associated with the reader. The system can use the mobile device as a proxy to forward the data to the reader. As a result, the mobile device will not process the data from the server.

When the data is received at the reader, the reader can decrypt the data using its cryptographic key and process the data. For example, the data can be an updated whitelist of approved message types. When the reader receives the updated whitelist, the reader can replace the original whitelist with the updated whitelist.

In some implementations, the card reader sends messages to the smart card in addition to receiving messages from the smart card. The messages can follow the EMV communication protocol between the smart card and the card reader. In some implementations, the card reader includes a list of approved messages. If the message is in the list of approved messages, the card reader is allowed to send the message to the smart card. Alternatively, the card reader can include a list of restricted messages. If the message is not in the list of restricted messages, the card reader is allowed to send the message to the smart card. These lists can protect a smart card from damaging itself by receiving unexpected messages, e.g., a card reader can forward messages received from a rogue mobile device.

Figure 5:
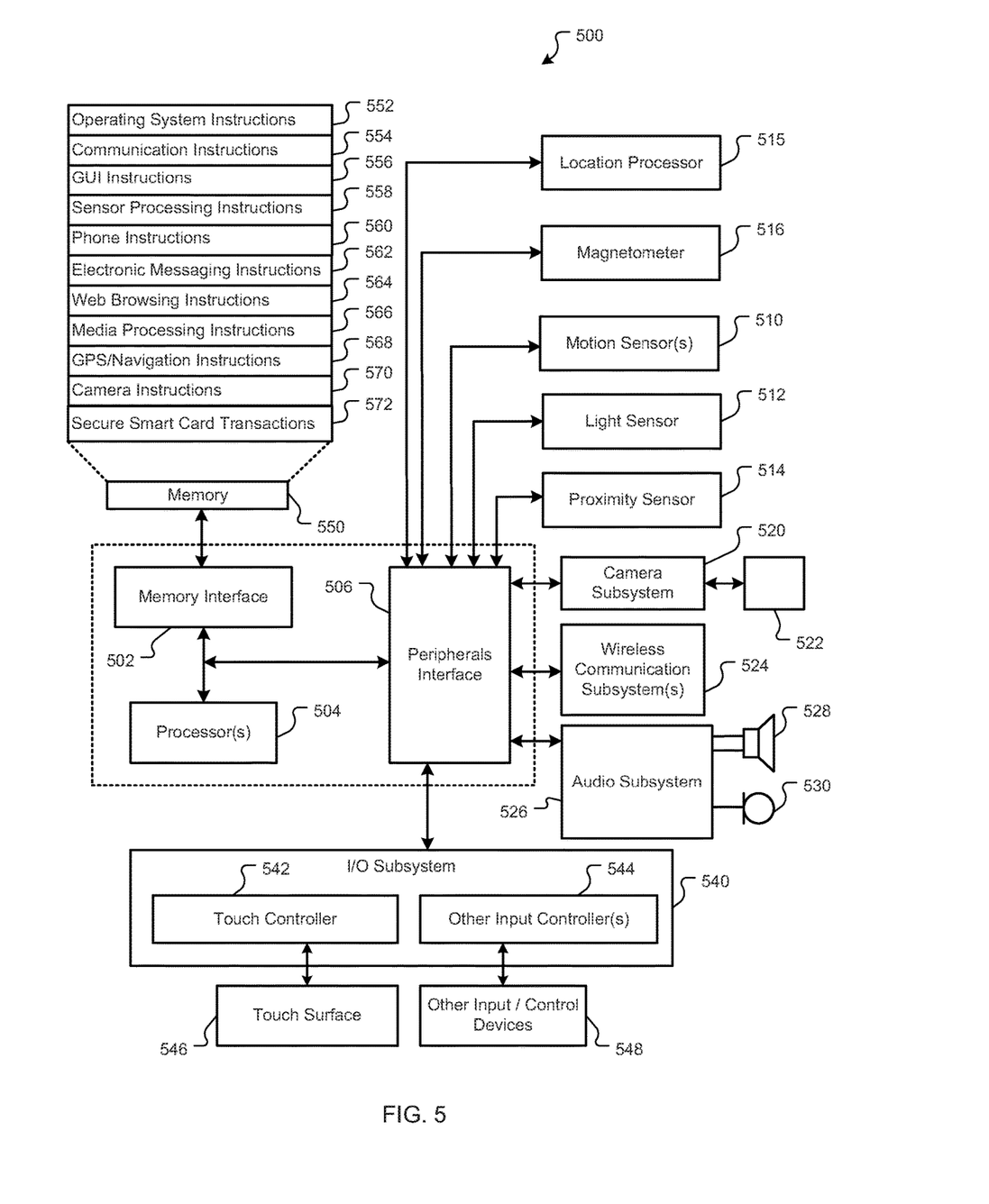
FIG. 5 is a block diagram of an exemplary architecture of a mobile device capable of conducting transactions with smart cards.

FIG. 5 is a block diagram of an exemplary architecture of a mobile device capable of conducting secure transactions with smart cards. Architecture 500 can be implemented in any device for generating the features described in reference to FIGS. 1-4, including but not limited to portable or desktop computers, smart phones and electronic tablets, television systems, game consoles, kiosks and the like. Architecture 500 can include memory interface 502, data processor(s), image processor(s) or central processing unit(s) 504, and peripherals interface 506. Memory interface 502, processor(s) 504 or peripherals interface 506 can be separate components or can be integrated in one or more integrated circuits. The various components can be coupled by one or more communication buses or signal lines.

Sensors, devices, and subsystems can be coupled to peripherals interface 506 to facilitate multiple functionalities. For example, motion sensor 510, light sensor 512, and proximity sensor 514 can be coupled to peripherals interface 506 to facilitate orientation, lighting, and proximity functions of the device. For example, in some implementations, light sensor 512 can be utilized to facilitate adjusting the brightness of touch surface 546. In some implementations, motion sensor 510 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 506, such as a temperature sensor, a biometric sensor, or other sensing device, to facilitate related functionalities.

Location processor 515 (e.g., GPS receiver) can be connected to peripherals interface 506 to provide geo-positioning. Electronic magnetometer 516 (e.g., an integrated circuit chip) can also be connected to peripherals interface 506 to provide data that can be used to determine the direction of magnetic North. Thus, electronic magnetometer 516 can be used as an electronic compass.

Camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 524. Communication subsystem(s) 524 can include one or more wireless communication subsystems. Wireless communication subsystems 524 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 524 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 524 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 526 can be coupled to a speaker 528 and one or more microphones 530 to facilitate voice-enabled functions, such as voice recognition, voice replication, digital recording, and telephony functions.

I/O subsystem 540 can include touch controller 542 and/or other input controller(s) 544. Touch controller 542 can be coupled to a touch surface 546. Touch surface 546 and touch controller 542 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 546. In one implementation, touch surface 546 can display virtual or soft buttons and a virtual keyboard, which can be used as an input/output device by the user.

Other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of speaker 528 and/or microphone 530.

In some implementations, device 500 can present recorded audio and/or video files, such as MP3, AAC, and MPEG files. In some implementations, device 500 can include the functionality of an MP3 player and may include a pin connector for tethering to other devices. Other input/output and control devices can be used.

Memory interface 502 can be coupled to memory 550. Memory 550 can include high-speed random access memory or non-volatile memory, such as one or more magnetic disk storage devices, one or more optical storage devices, or flash memory (e.g., NAND, NOR). Memory 550 can store operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 can include a kernel (e.g., UNIX kernel).

Memory 550 may also store communication instructions 554 to facilitate communicating with one or more additional devices, one or more computers or servers. Communication instructions 554 can also be used to select an operational mode or communication medium for use by the device, based on a geographic location (obtained by the GPS/Navigation instructions 568) of the device. Memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions and display GUIs; media processing instructions 566 to facilitate media processing-related processes and functions; GPS/Navigation instructions 568 to facilitate GPS and navigation-related processes; camera instructions 570 to facilitate camera-related processes and functions; and instructions 572 for conducting transactions with smart cards. The memory 550 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 550 can include additional instructions or fewer instructions. Furthermore, various functions of the mobile device may be implemented in hardware and/or in software, including in one or more signal processing and/or application specific integrated circuits.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of facilitating a transaction between a customer and a merchant using a smart card reader, the method comprising:

storing, by the smart card reader, a reader cryptographic key and a message type tag list that identifies a plurality of tag values, each tag value corresponding to at least one type of non-sensitive message;

reading, by the smart card reader, a first message from a smart card, wherein the first message includes a first tag value;

identifying, by the smart card reader, that the first message is non-sensitive by comparing the first tag value in the first message to the plurality of tag values in the message type tag list and determining that the first tag value in the first message matches a tag value of the plurality of tag values in the message type tag list, wherein the first message identifies one or more supported application types that are supported by the smart card;

in response to identifying that the first message is non-sensitive, transmitting, by the smart card reader, the first message to a mobile device communicatively coupled to the smart card reader;

receiving, by the smart card reader from the mobile device, a response message that is responsive to the first message, the response message identifying a selected application type of the one or more supported application types identified in the first message;

transmitting, by the smart card reader to the smart card, the selected application type;

receiving, by the smart card reader and from the smart card, a second message including a second tag value;

identifying, by the smart card reader, that the second message includes a sensitive portion that includes transaction information associated with the selected application type by comparing the second tag value in the second message to the plurality of tag values in the message type tag list and determining that the second tag value in the second message does not match a tag value of the plurality of tag values in the message type tag list;

formatting, by the smart card reader, the second message to conform to level 1 requirements of a transaction protocol at least by encapsulating at least the sensitive portion of the second message with a non-sensitive header identifying the transaction;

encrypting, by the smart card reader, the sensitive portion of the second message using the reader cryptographic key;

sending, by the smart card reader, the second message through the mobile device to a payment transaction server in response to encrypting the sensitive portion of the second message and formatting the second message to conform to the level 1 requirements of the transaction protocol; and receiving, by the smart card reader and from the payment transaction server through the mobile device, and in response to sending the second message to the payment transaction server, an indication that the payment transaction server has approved the transaction of the selected application type.

2. The method of claim 1, further comprising:

transmitting a third message from the smart card reader to the mobile device; and, determining, by the mobile device, a next step that conforms to level 2 requirements of the transaction protocol based on a timing between transmission of the first message to the mobile device and transmission of the third message to the mobile device.

3. The method of claim 1, wherein the selected application type is one of a credit application type or a debit application type, and wherein the transaction is one of a credit transaction or a debit transaction.

4. The method of claim 1, further comprising:

receiving, by the smart card reader, a prompt from the smart card requesting a PIN entry;

sending a PIN prompt message from the smart card reader to the mobile device; and receiving, at the smart card reader from a card issuer via the mobile device, one of an indication of successful PIN entry or an indication of failed PIN entry.

5. The method of claim 1, further comprising:

generating a nonce value at the smart card reader;

receiving, at the smart card reader from the mobile device, a transaction amount associated with the transaction; and sending, from the smart card reader to the payment transaction server via the mobile device, a cryptographic message authentication code (MAC) generated using at least the nonce value and the transaction amount, wherein the indication that the payment transaction server has approved the transaction of the selected application type is received after the MAC is sent.

6. A system for facilitating a transaction between a customer and a merchant, the system comprising:

a smart card reader comprising:
a reader interface;
a communication interface communicatively coupled to a mobile device;
a memory that stores instructions, a reader cryptographic key, and a message type tag list that identifies a plurality of tag values, each tag value corresponding to at least one type of non-sensitive message;

a controller coupled to the communication interface and the memory, wherein the instructions when executed by the controller cause the controller to perform operations including:

reading, using the reader interface, a first message from a smart card, wherein the first message includes a first tag value;

identifying that the first message is non-sensitive by comparing the first tag value in the first message to the plurality of tag values in the message type tag list and determining that the first tag value in the first message matches a tag value of the plurality of tag values in the message type tag list, wherein the first message identifies one or more supported application types that are supported by the smart card;

in response to identifying that the first message is non-sensitive, transmitting, using the communication interface, the first message to the mobile device;

receiving, using the communication interface, a response message that is responsive to the first message, the response message identifying a selected application type of the one or more supported application types identified in the first message;

transmitting, using the reader interface, the selected application type to the smart card;

receiving, from the smart card using the reader interface, a second message including a second tag value;

identifying that the second message includes a sensitive portion that includes transaction information associated with the selected application type by comparing the second tag value in the second message to the plurality of tag values in the message type tag list and determining that the second tag value in the second message does not match a tag value of the plurality of tag values in the message type tag list;

formatting the second message to conform to level 1 requirements of a transaction protocol at least by encapsulating at least the sensitive portion of the second message with a non-sensitive header identifying the transaction;

encrypting the sensitive portion of the second message using the reader cryptographic key;

sending, using the communication interface, the second message through the mobile device to a payment transaction server in response to encrypting the sensitive portion of the second message and formatting the second message to conform to the level 1 requirements of the transaction protocol; and in response to sending the second message to the payment transaction server, receiving using the communication interface, from the payment transaction server through the mobile device, an indication that the payment transaction server has approved the transaction of the selected application type.

7. The system of claim 6, wherein the instructions, when executed by the controller, further cause the controller to perform operations including:

receiving, from the mobile device using the communication interface, transaction details;

transmitting, using the reader interface, transaction details to the smart cart;

receiving, from the smart card using the reader interface, an authorization request cryptogram (ARQC) based on the transaction details; and transmitting, using the communication interface, the ARQC based on the transaction details to the payment transaction server prior to receiving the indication that the payment transaction server has approved the transaction of the selected application type.

8. The system of claim 6, wherein the smart card reader is embedded within the mobile device.

9. The system of claim 6, wherein the smart card reader is in electronic communication with the mobile device via an audio jack of the mobile device.

10. The system of claim 6, wherein the communication interface of the smart card reader includes at least one of a wireless local area network interface or a Bluetooth® interface.

11. A method of facilitating a transaction between a customer and a merchant using a smart card reader, the method comprising:

storing by the smart card reader, a reader cryptographic key and a message type tag list that identifies a plurality of tag values, each tag value corresponding to at least one type of sensitive message;

reading, by the smart card reader, a first message from a smart card, wherein the first message includes a first tag value;

identifying, by the smart card reader, that the first message is non-sensitive by comparing the first tag value in the first message to the plurality of tag values in the message type tag list and determining that the first tag value in the first message does not match a tag value of the plurality of tag values in the message type tag list, wherein the first message identifies one or more supported application types;

in response to identifying that the first message is non-sensitive, transmitting, by the smart card reader, the first message to a mobile device communicatively coupled to the smart card reader;

receiving, by the smart card reader from the mobile device, a response message that is responsive to the first message, the response message identifying a selected application type of the one or more supported application types identified in the first message;

transmitting, by the smart card reader to the smart card, the selected application type;

receiving, by the smart card reader and from the smart card, a second message including a second tag value;

identifying, by the smart card reader, that the second message includes a sensitive portion that includes transaction information associated with the selected application type by comparing the second tag value in the second message to the plurality of tag values in the message type tag list and determining that the second tag value in the second message matches a tag value of the plurality of tag values in the message type tag list;

formatting, by the smart card reader, the second message to conform to level 1 requirements of a transaction protocol at least by encapsulating at least the sensitive portion of the second message with a non-sensitive header identifying a transaction;

encrypting, by the smart card reader, the sensitive portion of the second message using the reader cryptographic key;

sending, by the smart card reader, the second message through the mobile device to a payment transaction server in response to encrypting the sensitive portion of the second message and formatting the second message to conform to the level 1 requirements of the transaction protocol; and receiving, by the smart card reader and from the payment transaction server through the mobile device, and in response to sending the second message to the payment transaction server, an indication that the payment transaction server has approved the transaction of the selected application type.

12. The method of claim 1, wherein the transaction protocol is a Europay Mastercard Visa (EMV) transaction protocol.

13. The method of claim 11, further comprising:
receiving by the smart card reader, a prompt from the smart card requesting a PIN entry;
sending a PIN prompt message from the smart card reader to the mobile device, the PIN prompt message requesting the PIN entry; and
receiving, at the smart card reader from a card issuer via the mobile device, one of an indication of successful PIN entry or an indication of failed PIN entry.

14. The method of claim 11, further comprising:
transmitting a third message from the smart card reader to the mobile device; and
determining, by the mobile device, a next step that conforms to level 2 requirements of the transaction protocol based on a timing between transmission of the first message to the mobile device and transmission of the third message to the mobile device, wherein the transaction protocol is a Europay Mastercard Visa (EMV) transaction protocol.

15. The method of claim 11, wherein the selected application type is one of a credit application type or a debit application type, and wherein the transaction is one of a credit transaction or a debit transaction.

16. The method of claim 11, further comprising:
generating a nonce value at the smart card reader;
receiving, at the smart card reader from the mobile device, a transaction amount associated with the transaction; and
sending, from the smart card reader to the payment transaction server via the mobile device, a cryptographic message authentication code (MAC) generated using at least the nonce value and the transaction amount, wherein the indication that the payment transaction server has approved the transaction of the selected application type is received after the MAC is sent.

17. A system for facilitating a transaction between a customer and a merchant, the system comprising:
a smart card reader comprising:
a reader interface;
a communication interface communicatively coupled to a mobile device;
a memory that stores instructions, a reader cryptographic key, and a message type tag list that identifies a plurality of tag values, each tag value corresponding to at least one type of sensitive message;
a controller coupled to the communication interface and the memory, wherein the instructions when executed by the controller cause the controller to perform operations including:

reading, using the reader interface, a first message from a smart card, wherein the first message includes a first tag value;

identifying that the first message is non-sensitive by comparing the first tag value in the first message to the plurality of tag values in the message type tag list and determining that the first tag value in the first message does not match a tag value of the plurality of tag values in the message type tag list, wherein the first message identifies one or more supported application types that are supported by the smart card;

in response to identifying that the first message is non-sensitive, transmitting, using the communication interface, the first message to the mobile device;

receiving, using the communication interface, a response message that is responsive to the first message, the response message identifying a selected application type of the one or more supported application types identified in the first message;

transmitting, using the reader interface, the selected application type to the smart card;

receiving, from the smart card using the reader interface, a second message including a second tag value;

identifying that the second message includes a sensitive portion that includes transaction information associated with the selected application type by comparing the second tag value in the second message to the plurality of tag values in the message type tag list and determining that the second tag value in the second message matches a tag value of the plurality of tag values in the message type tag list;

formatting the second message to conform to level 1 requirements of a transaction protocol at least by encapsulating at least the sensitive portion of the second message with a non-sensitive header identifying the transaction;

encrypting the sensitive portion of the second message using the reader cryptographic key;

sending, using the communication interface, the second message through the mobile device to a payment transaction server in response to encrypting the sensitive portion of the second message and formatting the second message to conform to the level 1 requirements of the transaction protocol; and in response to sending the second message to the payment transaction server, receiving using the communication interface, from the payment transaction server through the mobile device, an indication that the payment transaction server has approved the transaction of the selected application type.

18. The system of claim 17, wherein the instructions, when executed by the controller, further cause the controller to perform operations including:

receiving, from the mobile device using the communication interface, transaction details;

transmitting, using the reader interface, transaction details to the smart card;

receiving, from the smart card using the reader interface, an authorization request cryptogram (ARQC) based on the transaction details; and transmitting, using the communication interface, the ARQC based on the transaction details to the payment transaction server prior to receiving the indication that the payment transaction server has approved the transaction of the selected application type.

19. The system of claim 17, wherein the smart card reader is embedded within the mobile device.

20. The system of claim 17, wherein the smart card reader is in electronic communication with the mobile device via an audio jack of the mobile device.

21. The system of claim 17, wherein the communication interface of the smart card reader includes at least one of a wireless local area network interface or a Bluetooth® interface.

\* \* \* \* \*